US010973077B2

United States Patent
Sunell et al.

(10) Patent No.: US 10,973,077 B2
(45) Date of Patent: Apr. 6, 2021

(54) WIRELESS COMMUNICATION DEVICE, A CORE NETWORK NODE AND METHODS THEREIN

(71) Applicant: Telefonaktiebolaget LM Ericsson (publ), Stockholm (SE)

(72) Inventors: Kai-Erik Sunell, Bromma (SE); Peter Hedman, Helsingborg (SE); Håkan Palm, Växjö (SE); Paul Schliwa-Bertling, Ljungsbro (SE); Riikka Susitaival, Helsinki (FI); Martin Van Der Zee, Malmö (SE); Emre Yavuz, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/109,889

(22) PCT Filed: May 11, 2016

(86) PCT No.: PCT/SE2016/050420
§ 371 (c)(1),
(2) Date: Jul. 6, 2016

(87) PCT Pub. No.: WO2016/182498
PCT Pub. Date: Nov. 17, 2016

(65) Prior Publication Data
US 2017/0150466 A1 May 25, 2017

Related U.S. Application Data

(60) Provisional application No. 62/160,632, filed on May 13, 2015.

(51) Int. Cl.
*H04W 76/28* (2018.01)
*H04W 4/70* (2018.01)
(Continued)

(52) U.S. Cl.
CPC ............. *H04W 76/28* (2018.02); *H04W 4/70* (2018.02); *H04W 52/0216* (2013.01);
(Continued)

(58) Field of Classification Search
CPC ..... H04W 12/06; H04W 60/00; H04W 60/04; H04W 8/04; H04W 4/005; H04W 68/02; H04W 76/048; H04W 8/26
(Continued)

(56) References Cited

U.S. PATENT DOCUMENTS

2005/0215230 A1* 9/2005 Cheng ................... H04W 64/00
455/404.2
2013/0039244 A1* 2/2013 Sun .................... H04W 52/0222
370/311
(Continued)

FOREIGN PATENT DOCUMENTS

CN 103026763 A 4/2013
CN 103532684 A 1/2014
(Continued)

OTHER PUBLICATIONS

3GPP TR 23.770 v1.1.0; Technical Report; 3rd Generation Partnership Project; Technical Specification Group Services and System Aspects; Study on System Impacts of Extended DRX Cycle for Power Consumption Optimization (Release 13)—Jun. 2015.
(Continued)

*Primary Examiner* — Lester G Kincaid
*Assistant Examiner* — Nicole M Louis-Fils
(74) *Attorney, Agent, or Firm* — Baker Botts, LLP

(57) ABSTRACT

A method performed by a wireless communication device for monitoring for a paging message from a core network node in a wireless communications network.
The wireless communication device monitors (304) for the paging message at one or more paging occasions during a
(Continued)

time period for monitoring paging. The start of the time period is based on an instant of time when the wireless communication device registers to the core network node.

12 Claims, 12 Drawing Sheets

(51) Int. Cl.
  *H04W 52/02* (2009.01)
  *H04W 68/00* (2009.01)
  *H04W 60/00* (2009.01)
  *H04W 68/02* (2009.01)
(52) U.S. Cl.
  CPC ......... *H04W 60/00* (2013.01); *H04W 68/005* (2013.01); *H04W 68/02* (2013.01); *Y02D 30/70* (2020.08)
(58) Field of Classification Search
  USPC .......................... 455/435, 515; 370/252, 331
  See application file for complete search history.

(56) References Cited

U.S. PATENT DOCUMENTS

| | | | |
|---|---|---|---|
| 2013/0301501 A1 | 11/2013 | Olvera-Hernandez et al. | |
| 2013/0303203 A1* | 11/2013 | Wang | H04W 68/00 455/458 |
| 2013/0308465 A1* | 11/2013 | Xu | H04W 76/048 370/241 |
| 2014/0016614 A1* | 1/2014 | Velev | H04W 4/70 370/331 |
| 2014/0092799 A1* | 4/2014 | Jain | H04L 5/0035 370/311 |
| 2014/0334366 A1* | 11/2014 | Hsu | H04W 52/0225 370/311 |
| 2015/0098381 A1* | 4/2015 | Cucala Garc A | H04W 52/0216 370/311 |
| 2015/0223198 A1* | 8/2015 | Du | H04W 52/0203 455/458 |
| 2016/0044578 A1* | 2/2016 | Vajapeyam | H04W 76/28 370/252 |
| 2016/0081022 A1* | 3/2016 | Haneji | H04W 52/0229 370/311 |
| 2016/0295504 A1* | 10/2016 | Wang | H04W 52/02 |
| 2017/0339644 A1* | 11/2017 | Lee | H04W 8/005 |

FOREIGN PATENT DOCUMENTS

| | | |
|---|---|---|
| CN | 104125612 A | 10/2014 |
| CN | 104185278 A | 12/2014 |
| GB | 2 483 752 | 3/2012 |
| WO | 2014/176058 A1 | 10/2014 |
| WO | WO 2014/158268 | 10/2014 |
| WO | WO 2014/168537 | 10/2014 |
| WO | 2014/185538 A1 | 11/2014 |

OTHER PUBLICATIONS

3GPP TS 23.682 v13.6.0; Technical Specification; 3rd Generation Partnership Project; Technical Specification Group Services and System Aspects; Architecture enhancements to facilitate communications with packet data networks and applications (Release 13)—Jun. 2016.
3GPP TSG-RAN WG2 #90; Fukuoka, Japan; Source: Ericsson; Title: eDRX concepts for idle and connected mode (Tdoc R2-152423)—May 25-29, 2015.
SS WG2 Meeting #109; Fukuoka, Japan; Source: Ericsson; Title: Extended DRX in Idle (S2-151602)—May 25-29, 2015.
PCT International Search Report for International application No. PCT/SE2016/050420—dated Aug. 11, 2016.
PCT Written Opinion of the International Searching Authority for the International application No. PCT/SE2016/050420—dated Aug. 17, 2016.
3GPP TR 23.770 v0.2.0; Technical Report; 3rd Generation Partnership Project; Technical Specification Group Services and System Aspects; Study on System Impacts of Extended DRX Cycle for Power Consumption Optimization (Release 13)—Apr. 2015.
3GPP TS 23.401 v13.2.0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 13)—Mar. 2015.
3GPP TS 36.304 v12.4.0; Technical Specification; 3rd Generation Partnership Project; Technical Specification Group Radio Access Network; Evolved Universal Terrestrial Radio Access (E-UTRA); User Equipment (UE) Procedures in Idle Mode (Release 12)—Mar. 2015.
Chinese Office Action for Application No. 201680027646.6 dated Oct. 28, 2019, 8 pages.

* cited by examiner

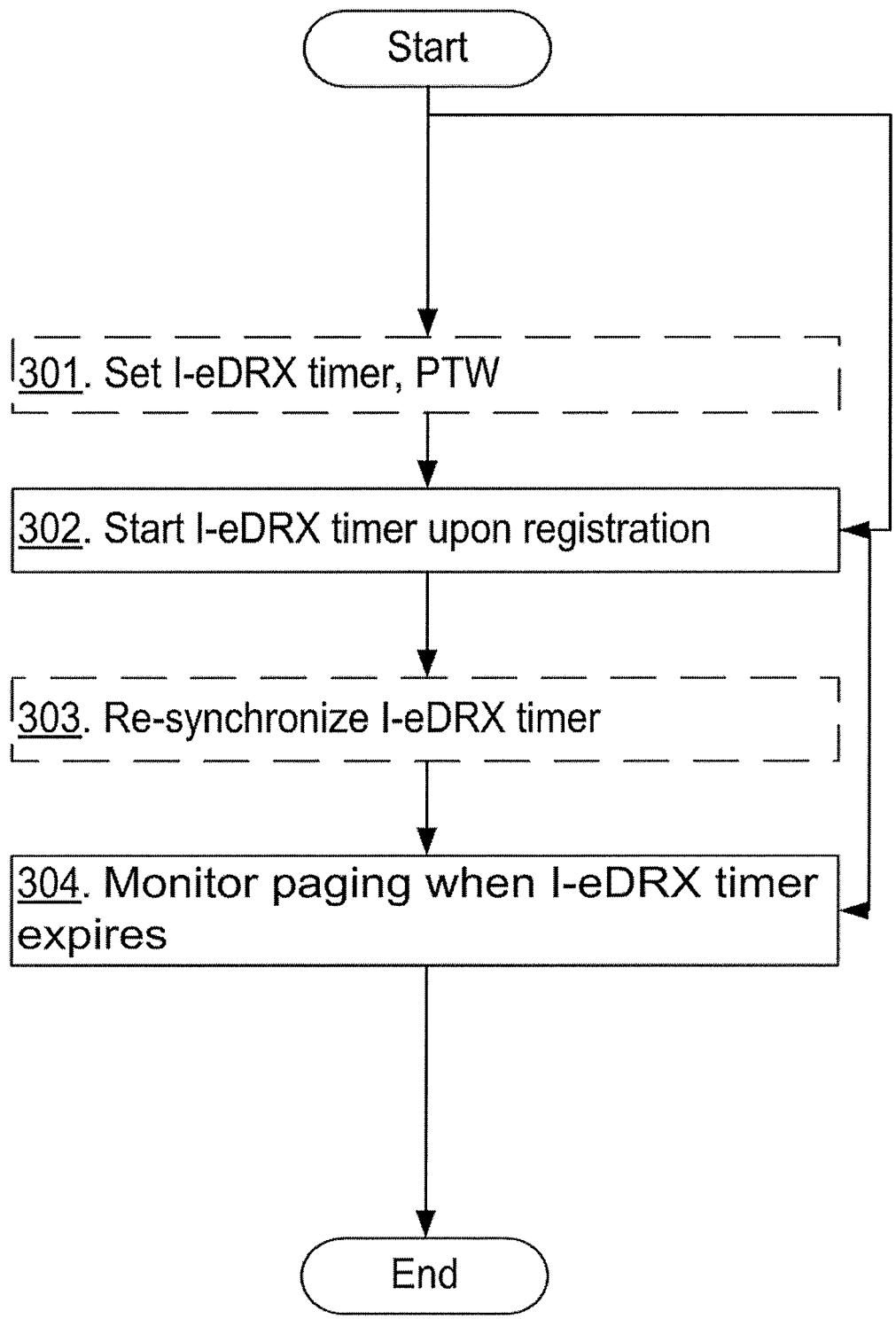
Fig. 3 Method in UE

Fig. 5 Method in MME

WIRELESS COMMUNICATION DEVICE, A CORE NETWORK NODE AND METHODS THEREIN

PRIORITY

This nonprovisional application is a U.S. National Stage Filing under 35 U.S.C. § 371 of International Patent Application Serial No. PCT/SE2016/050420 filed May 11, 2016, and entitled "A Wireless Communication Device, A Core Network Node And Methods Therein" which claims priority to U.S. Provisional Patent Application No. 62/160,632 filed May 13, 2015, both of which are hereby incorporated by reference in their entirety.

TECHNICAL FIELD

Embodiments herein relate to a wireless communication device, a core network node and methods therein for handling an extended DRX cycle in a wireless communications system. In particular they relate to monitoring for paging messages and providing paging messages during a time period for paging.

They may further relate to determining a paging occasion when using extended paging cycles longer than a frame number range.

BACKGROUND

In a typical radio communications network, wireless communication devices, also known as mobile stations and/or user equipments (UEs), communicate via a Radio Access Network (RAN) to one or more Core Networks (CN). The radio access network covers a geographical area which is divided into cell areas, with each cell area being served by a base station, e.g., a radio base station (RBS), which in some networks may also be called, for example, a "NodeB" or evolved Node B (eNB, eNode B). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In LTE the base station nodes are for example directly connected to Mobility Management Entities (MME). The MME is responsible for idle mode UE tracking and paging procedure including retransmissions. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

Machine Type Communications (MTC) is an area within telecommunications, sometimes also referred to as M2M or Internet of Things (IoT), in which it is envisioned that all types of devices which may potentially benefit from communicating will do so. That is, everything from agriculture and/or industrial sensors and actuators to things in the smart home or workout gauges in the personal networks will be connected wirelessly. Many devices may not, like a smart phone, be charged frequently and therefore it is beneficial if many of the MTC wireless communication devices, or UEs, try to conserve energy and power by sleeping as much as possible, i.e., having as much of their circuitry turned off as much as possible. For example, sensors and other devices may reside in remote locations and the number of deployed devices may be so large that it may be practically infeasible to replace the batteries of this kind of devices. Thus, it is an important goal to aim for reduction in the power consumption when considering improvements for current wireless or cellular systems.

In wireless communications networks, such as in 3GPP LTE networks, the UEs may save power by a discontinuous reception (DRX) mechanism. During DRX the UE may keep its receiver circuitry powered off to save power except at configured intervals. But during a DRX sleep the network may not reach the UE to inform it about incoming data traffic, system information updates, etc.

When the network tries to send data traffic to the UE, the network uses a paging procedure, where a paging message is sent from the CN through the base station to the UE. The paging message lets the RAN and the UE know that the CN is looking for the UE. The UE is expected to listen to the paging channel at certain time instants which are calculated using UE identification number (IMSI) and the current System Frame Number (SFN) in the cell. For a UE in idle mode this procedure is specified in 3GPP TS 36.304, e.g. in version 12.4.0. During each DRX cycle the UE goes to sleep after monitoring the DL channels if there is no activity. In LTE, the SFN denotes a radio frame, which is 10 ms in length, comprising 10 subframes. The available SFN number goes from 0 to 1023. The full SFN cycle length is 10.24 seconds, therefore the SFN wraps around every 10.24 seconds in each cell. The UE should be awake at least during one paging occasion during a DRX cycle so the network paging message may reach the UE. The paging occasion is defined as the subframe during which the UE shall monitor the paging message. The paging occasion and Paging Frame (PF) is determined based on the length of the DRX cycle of the UE and based on an identification of the UE, such as a UE ID in LTE.

When a UE wakes up in a cell and does not know the downlink timing of the radio frames, the subframes and the symbols, it needs to obtain synchronization to the network first. There are different technology dependent ways to achieve these synchronizations. In LTE, in order to calculate the paging frame and the paging occasion the SFN synchronization is obtained. This may be achieved by reading the broadcasted Master Information Block (MIB) which includes information on the current SFN. If the UE sleeps for a very long period, its internal clock may experience clock drift large enough to require the UE to read the MIB again after the UE has woken up.

In the current LTE system the DRX cycle length and thus the paging cycle length is at most 2.56 seconds. For UMTS currently the longest specified DRX cycle lengths is 5.12 s.

As mentioned above it is important to save power and therefore there is incentive to extend the DRX cycle length in order to save more power, especially for MTC UEs. However, if the DRX cycle length in idle more, i.e. the paging cycle length, of the UEs is extended beyond the SFN range, the current procedures of determining the paging occasion are not applicable any more.

LTE will be used as examples of a wireless communications network in which a problem may arise.

The current procedures in LTE, and similar procedures in UMTS, determine one paging occasion per SFN period. In LTE the paging occasion is given by SFN mod T=(T div N)*(UE_ID mod N), where T is the DRX cycle of the UE and N is the minimum of T and nB, where nB is chosen from 4T, 2T, T, T/2, T/4, T/8, T/16, T/32. Since there is one paging occasion per SFN period the paging cycle, i.e. the period between paging occasions cannot be longer than one SFN period.

Moreover, the SFN is not synchronized across different cells. Thus, if the UE moves to another cell while it is sleeping, this will also lead to problems related to the calculation of the correct wake-up time for paging, especially if the maximum paging cycle is extended. This is especially a problem if the maximum paging cycle is extended and even in the case the SFN range is extended.

As described above extended DRX cycles may require some changes or alternative ways of handling procedures and features which rely on the relatively short timers governing the DRX cycles and the fact that legacy UEs may be assumed to be reached, i.e. respond to paging, at most after a couple of seconds.

In idle mode, extending the DRX cycle may mean extending a UE-specific paging-cycle and allowing a UE-specific paging cycle to be used instead of the shorter default system paging cycle.

As described above, in a RAN the SFNs are used as the time reference when calculating paging frames and occasions.

When DRX cycle lengths are increased beyond the SFN range, which is currently 10.24 s, an alternative mechanism is needed to indicate times for UEs to receive paging.

One way to achieve this would be a direct extension of the SFN numbering scheme, i.e., using more bits for indicating the SFN in one way or another.

However, by simply extending the SFN range, a new problem would occur especially affecting mobile UEs. Considering that different cells, and their respective eNBs, are typically not synchronized with respect to the SFN, there are issues to guarantee certain paging reliability and thus reachability for UEs changing cells. A paging occasion may be missed because a given paging occasion occurs at different points in time in different cells due to the lack of synchronization of the SFN between cells and because the UE may perform cell reselection during a DRX sleeping period.

SUMMARY

As mentioned above if the DRX cycle length or the paging cycle length of the UEs is extended beyond the SFN range, the current procedures of determining the paging occasion are not applicable any more.

An alternative way is to keep the legacy SFN numbering scheme but achieve reliable paging by defining a paging transmission window in time when a paging message is expected to be transmitted. During the paging transmission window, a Mobility Management Entity (MME), or a Serving GPRS support node (SGSN) in UMTS, may send the paging request messages to a base station, such as an eNB, which then may use the legacy paging frame and occasion to send the paging message over the radio interface.

In order to ensure that the paging request is sent during those occasions when the UE is reachable, synchronization of the DRX at the UE and the MME may be performed, e.g. with a timer mechanism.

The timer may be started at the sender and receiver sides at the same, or almost the same, time such that the paging message is sent during the time when the UE is reachable. For example the timer may be started when the UE goes to sleep and when the timer lapses the UE is reachable again. That is, when the timer has run out the UE is reachable again.

However, a trigger for such a timer may be subject to uncertainties in the radio environment. For example errors in the radio propagation path may prevent the wireless communications network to reliably know every occasion when the UE goes to sleep. When the timer is started and stopped many times, there is a considerable risk that sooner or later the wireless communications network and the UE end up out of synchronization. Then the wireless communications network may not be able to page the UE anymore.

Moreover, the timer may not be left running an arbitrarily long time without any kind of resynchronization because that may result in clock drift caused by the hardware, i.e. one of the timers may elapse slightly faster than the other. In the long-term, that may create similar kind of reachability issues as the uncertainties in the radio environment.

It is therefore an object of embodiments herein to provide an improved way of handling an extended DRX cycle and thus an extended paging cycle in a wireless communication system. A further object of embodiments herein is to provide an improved way of paging a wireless communication device.

A further object of embodiments herein may be to provide an improved way of determining a time period when the wireless communication device is to monitor for the paging message.

Embodiments herein relate to a DRX cycle length, a paging cycle length and to paging monitoring of wireless communication devices.

In brief, achieving the objects involves a wireless communication device and a core network node that each keeps track of the timing until next paging.

According to a first aspect of embodiments herein, the object is achieved by a method performed by a wireless communication device for monitoring for a paging message from a core network node in a wireless communications network.

The wireless communication device monitors for the paging message at one or more paging occasions during a time period for monitoring paging. The start of the time period is based on an instant of time when the wireless communication device registers to the core network node.

According to a second aspect of embodiments herein, the object is achieved by a wireless communication device configured for monitoring for a paging message from a core network node in a wireless communications network. The wireless communication device is configured to monitor for the paging message at one or more paging occasions during a time period for monitoring paging. The start of the time period is based on an instant of time when the wireless communication device registers to the core network node.

According to a third aspect of embodiments herein, the object is achieved by a method performed by a core network node for providing a paging message to a wireless communication device in a wireless communications network. The core network node provides the wireless communication device with a paging message during a time period for monitoring paging. The start of the time period is based on an instant of time when the wireless communication device registers to the core network node.

According to a fourth aspect of embodiments herein, the object is achieved by a core network node configured for providing a paging message to a wireless communication device in a wireless communications network. The core network node is configured to provide the wireless communication device with a paging message during a time period for monitoring paging. The start of the time period is based on an instant of time when the wireless communication device registers to the core network node.

According to a further aspect of embodiments herein, the object is achieved by a method performed by a wireless communication device for monitoring for a paging message from a core network node in a wireless communications network.

The wireless communication device comprises a processor and a memory. Said memory containing instructions executable by said processor whereby said wireless communication device is operative to monitor for the paging message at one or more paging occasions during a time period for monitoring paging. The start of the time period is based on an instant of time when the wireless communication device registers to the core network node.

According to a further aspect of embodiments herein, the object is achieved by a core network node for providing a paging message to a wireless communication device in a wireless communications network.

The core network node comprises a processor and a memory. Said memory containing instructions executable by said processor whereby said core network node is operative to provide the wireless communication device with a paging message during a time period for monitoring paging. The start of the time period is based on an instant of time when the wireless communication device registers to the core network node.

According to a further aspect of embodiments herein, the object is achieved by a computer program product comprising software instructions that, when executed in a processor, performs the method according to the first aspect above or the method according to the third aspect above.

According to a further aspect of embodiments herein, the object is achieved by a wireless communication device for monitoring for a paging message from a core network node in a wireless communications network.

The wireless communication device comprises a monitoring module configured to monitor for the paging message at one or more paging occasions during a time period for monitoring paging. The start of the time period is based on an instant of time when the wireless communication device registers to the core network node.

According to a further aspect of embodiments herein, the object is achieved by a core network node for providing a paging message to a wireless communication device in a wireless communications network.

The core network node comprises a providing module configured to provide the wireless communication device with a paging message during a time period for monitoring paging. The start of the time period is based on an instant of time when the wireless communication device registers to the core network node.

Since the start of the time period for monitoring paging is based on when the wireless communication device registers with the core network node a more robust method for handling an extended paging cycle is obtained.

The methods are robust because they are decoupled from the events in the RAN and they are therefore not subject to any uncertainties in the radio propagation path.

Embodiments herein describe a method for robust DRX timer triggering and re-synchronization.

For example, the instant of time when the wireless communication device registers to the core network node may trigger the DRX timers in the wireless communication device and the core network node, and each subsequently successful Non-Access Stratum (NAS) level procedure may re-synchronize the DRX timers between the wireless communication device and the core network, i.e. the core network node.

An advantage with embodiments herein is that they support paging for wireless communication devices which follow longer paging cycles without impacting the paging message transmission on the radio access network.

Longer paging cycles enable significant power saving gains for wireless communication devices, such as UEs. This is especially advantageous for MTC devices.

The wireless communication devices may be paged on different cells which do not have synchronized SFN, since the wireless communication device and the core network node keep track of the timing until next paging.

BRIEF DESCRIPTION OF THE DRAWINGS

Examples of embodiments herein are described in more detail with reference to attached drawings in which:

FIG. 3 is a flowchart depicting embodiments of a method for monitoring for a paging message performed by a wireless communication device.

DETAILED DESCRIPTION

Embodiments herein are described in terms of an LTE network with EPC. Embodiments herein may also be applicable to other cellular and wireless systems making use of paging as well, such as GSM and WCDMA/UMTS.

Embodiments herein present a method which is implemented in a wireless communication device and a core network node. MME is used as an example of the core network node in the following, but generally it may be another node in control of sending a paging message as well, for example for UMTS and GSM the applicable CN node is the SGSN.

The wireless communication device will be exemplified with a UE. Between the wireless communication device and the core network node there is a base station node, which will schedule the paging messages over a radio link to the wireless communication device. The eNB is used as an example of a base station node in the following.

In embodiments herein an extended DRX cycle is started, e.g. using some implementation specific DRX timer, when the wireless communication device registers to the core network node, e.g. during an Attach procedure. This may for example happen when the wireless communication device is turned on. The DRX timer may be subsequently resynchronized at each communication occasion on the NAS level between the wireless communication device and the core network node.

Using LTE as the example network in embodiments herein, an extended DRX cycle is started, using some implementation specific DRX timer, when the UE registers to the MME, e.g. during the Attach procedure. The timer may be subsequently resynchronized at each UE/CN communication occasion on the NAS level.

The DRX timer mechanism for extended DRX cycles becomes more robust because it is not subject to uncertainties in the radio propagation path and it is not adversely impacted by the clock drift caused by hardware and implementation related differences.

Figure 1:
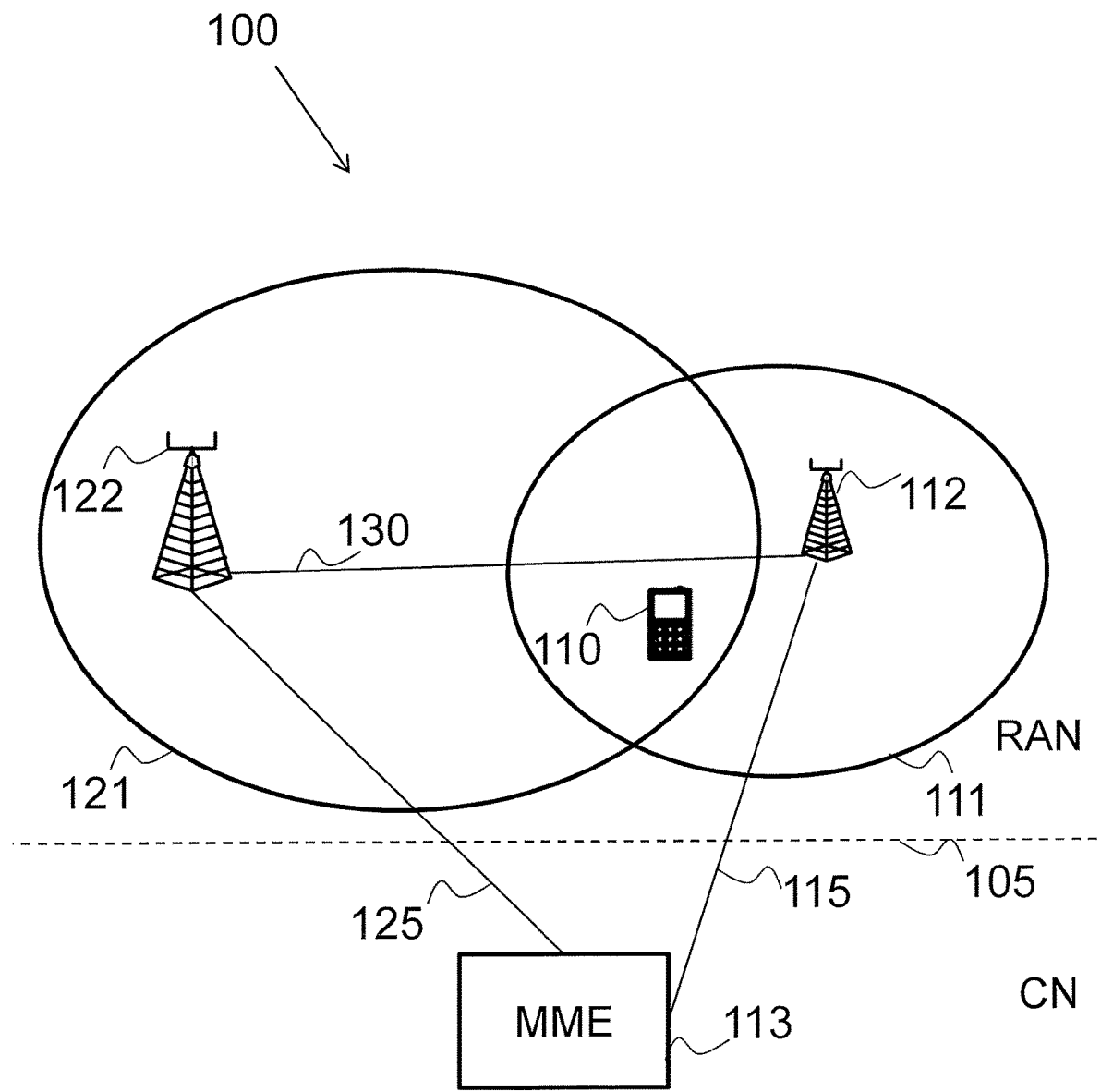
FIG. 1 is a schematic block diagram illustrating embodiments of a wireless communications network.

Embodiments herein may be implemented in one or more wireless communications networks whereof FIG. 1 depicts parts of a wireless communications network 100 also known as radio communications network, a telecommunications network or similar. The wireless communication network 100 comprises one or more RAN and one or more CN. FIG. 1 shows one RAN connected to one CN, wherein the dashed line 105 schematically illustrates the separation of the RAN from the CN. The wireless communication network 100 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communications network 100 is exemplified herein as an LTE network.

The wireless communications network 100 may further be implemented such as any 3GPP wireless communications network, such as LTE, UMTS, GSM/EDGE, or any cellular wireless communications network or system wherein a core network node sends paging messages to a wireless communication device via a base station.

In the wireless communications network 100, a wireless communication device 110, also known as a mobile station, wireless device, a user equipment and/or a wireless terminal, is capable of communicating via a RAN to one or more CNs. It should be understood by the skilled in the art that "wireless communication device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

There may of course be more than one wireless communication device that communicates via the RAN to the one or more CN.

The wireless communication network 100 covers a geographical area which is divided into cell areas, e.g. a cell 111 being served by a radio access node 112, such as a base station. The cell 111 may in some embodiments herein also be referred to as a first cell 111. This is the case when the embodiments refer to several cells, e.g. when the wireless communication device 110 performs cell reselection.

The radio access node 112 may also be referred to as a radio base station and e.g. a NodeB, an evolved Node B (eNB, eNode B), a base transceiver station, Access Point Base Station, base station router, or any other network unit capable of communicating with the wireless communication device 110 within the cell 111 served by the radio access node 112 depending e.g. on the radio access technology and terminology used.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 111 uniquely in the whole wireless communication network 100 is also broadcasted in the cell 111. The radio access node 112 communicates over the air or radio interface operating on radio frequencies with the wireless communication device 110 within range of the radio access node 112. The wireless communication device 110 transmits data over the radio interface to the radio access node 112 in Uplink (UL) transmissions and the radio access node 112 transmits data over an air or radio interface to the wireless communication device 110 in Downlink (DL) transmissions.

In the wireless communications network 100 a core network node 113, such as an MME, operates. As mentioned above, in UMTS and in GSM the core network node 113 may be an SGSN. The wireless communication device 110 communicates with the core network node 113, via the radio access node 112, on matters such as paging.

To facilitate the communication between the radio access node 112 and the core network node 113 the wireless communications network 100 may comprise an interface 115, such as an S1-MME interface.

The wireless communications network 100 may further comprises a second cell 121 being served by a second radio access node 122, such as a second base station. The second radio access node 122 may also be referred to as a radio base station and e.g. a NodeB, an evolved Node B (eNB, eNode B), a base transceiver station, Access Point Base Station, base station router, or any other network unit capable of communicating with the wireless communication device 110 within the second cell 121 served by the second radio access node 122 depending e.g. on the radio access technology and terminology used.

The wireless communication device may 110 communicate with the core network node 113, via the second radio access node 122, on matters such as paging.

To facilitate the communication between the second radio access node 122 and the core network node 113 the wireless communications network 100 may comprise a second interface 125, such as an S1-MME interface.

The radio access node 112 and the second radio access node 122 may communicate with each other. To facilitate the communication between the radio access node 112 and the second radio access node 122 the wireless communications network 100 may comprise a third interface 130, such as an X2 interface.

It should be noted that the following embodiments are not mutually exclusive. Components from one embodiment may be tacitly assumed to be present in another embodiment and it will be obvious to a person skilled in the art how those components may be used in the other exemplary embodiments.

As mentioned above it is beneficial if many of the MTC wireless communication devices, or UEs, try to conserve energy and power by sleeping as much as possible, i.e., having as much of their circuitry turned off as much as possible. Therefore extended paging cycles are desirable.

Actions for handling an extended discontinuous reception cycle eDRX related to an extended paging cycle in the wireless communications system 100 according to embodiments herein will now be described in relation to FIG. 2a, FIG. 2b, FIG. 3 and FIG. 5 and with continued reference to FIG. 1. The extended discontinuous reception cycle in idle mode may be referred to as an idle mode extended discontinuous reception cycle I-eDRX. The extended discontinuous reception cycle eDRX and the idle mode extended discontinuous reception cycle I-eDRX will be used interchangeably herein since embodiments herein relate to the extended discontinuous reception cycle in idle mode.

Figure 2A:
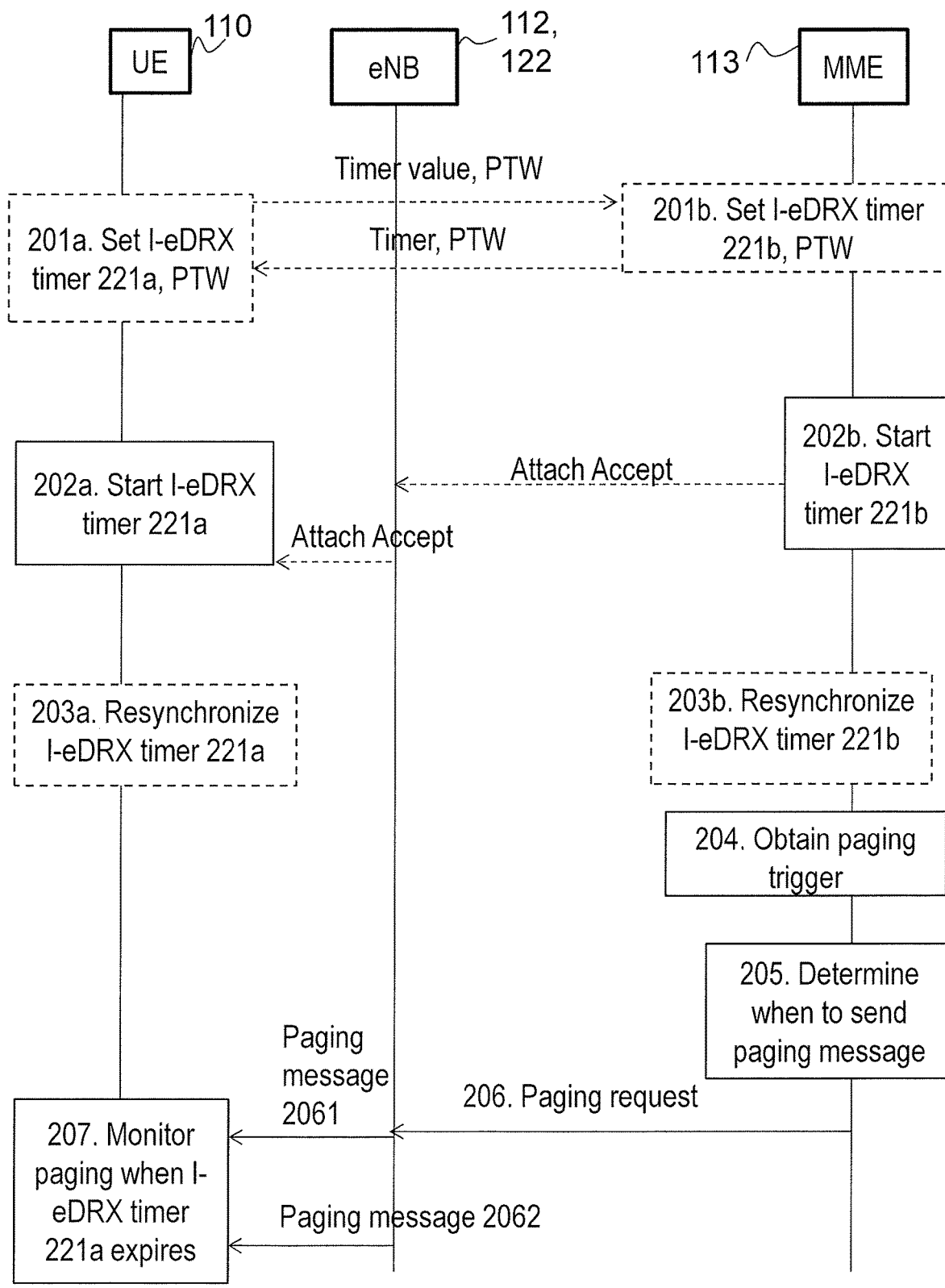
FIG. 2a is a combined signalling diagram and flow chart illustrating a method for paging in a wireless communications network according to embodiments herein.
Figure 2B:
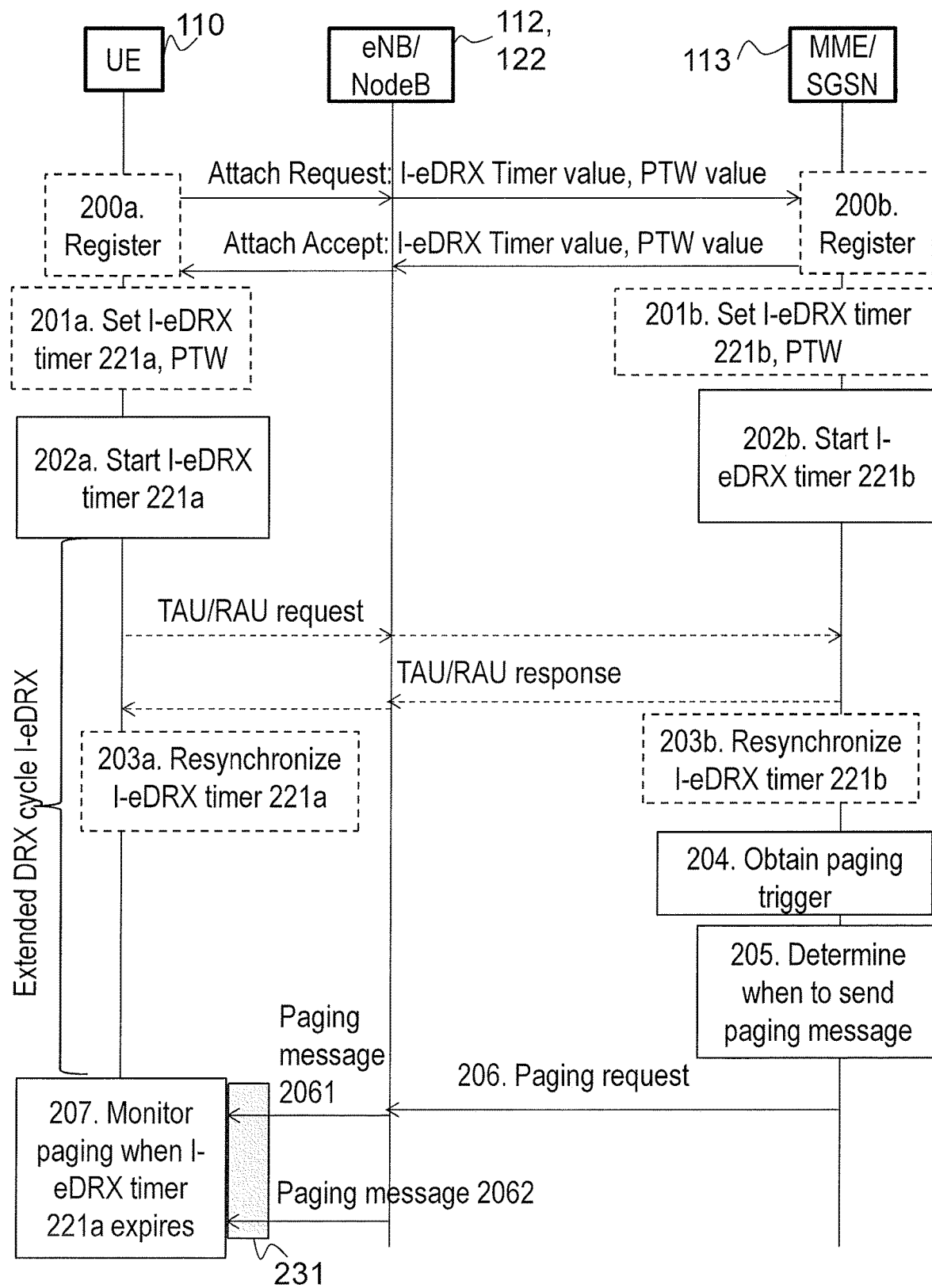
FIG. 2b is a further combined signalling diagram and flow chart illustrating a method for paging in a wireless communications network according to embodiments herein.

FIG. 2a and FIG. 2b are combined signalling diagrams and flow charts that describe a method for handling an extended DRX cycle and an extended paging cycle according to embodiments herein. FIG. 2b describes some additional details not shown in FIG. 2a. FIGS. 2a and 2b describe a method performed by the wireless communication device 110 for monitoring for a paging message 2061, 2062 from the core network node 113. FIGS. 2a and 2b further describe a method performed by the core network node 113 for paging the wireless communication device 110, i.e. for sending the message 2061, 2062 to the wireless communication device 110. The paging message 2061, 2062 may be received when the extended DRX cycle is used.

The extended DRX cycle I-eDRX is used for receiving the paging message 2061, 2062 from the core network node 113 comprised in the wireless communications network 100. The extended DRX cycle I-eDRX is longer than a frame number range of the wireless communications network 100. The frame number range may for example be the SFN range.

FIG. 3 is a flowchart that describes a method performed by the wireless communication device 110 for handling the extended DRX cycle I-eDRX and the extended paging cycle according to embodiments herein. FIG. 3 further describes a method performed by the wireless communication device 110 for monitoring for a paging message 2061, 2062. The paging message 2061, 2062 may be received when the extended DRX cycle I-eDRX is used.

Figure 5:
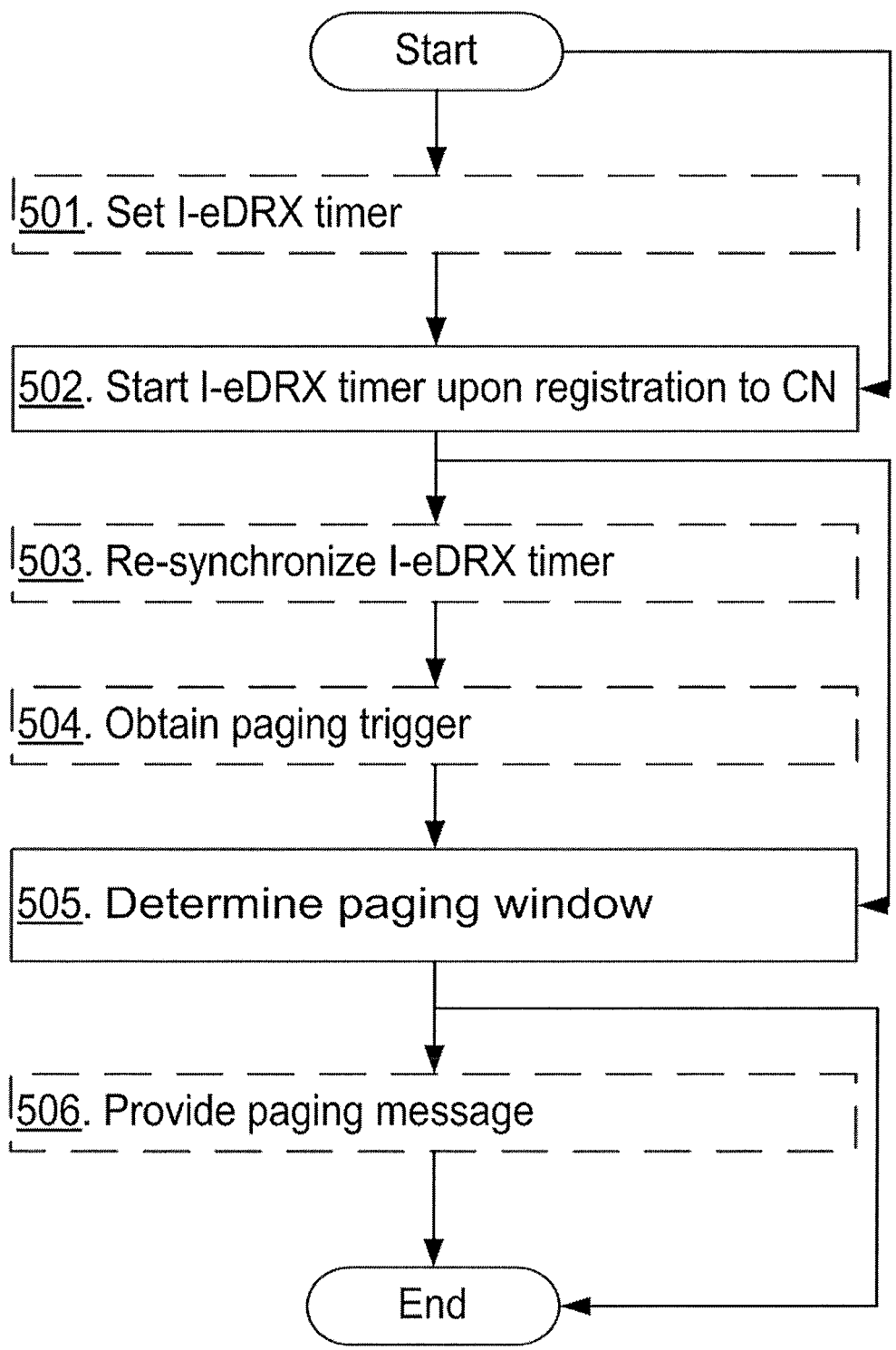
FIG. 5 is a flowchart depicting embodiments of a method for providing a paging message performed by a core network node.

FIG. 5 is a flowchart that describes a method performed by the core network node 113 for handling the extended DRX cycle I-eDRX and the extended paging cycle according to embodiments herein. FIG. 5 further describes a method performed by the core network node 113 for providing the paging message 2061, 2062 to the wireless communication device 110. The paging message 2061, 2062 may be received when the extended DRX cycle is used.

The extended DRX cycle I-eDRX is used by the wireless communication device 110 for receiving the paging message 2061, 2062 from the core network node 113. The core network node 113 may send the paging message 2061, 2062 via one of the radio access nodes 112, 122, for example in a paging request message. The extended discontinuous reception cycle I-eDRX may be longer than a frame number range of the wireless communications network 100.

As mentioned above, there may be a lack of SFN level synchronization between the first cell 111 and the second cell 121, and the wireless communication device 110 may perform cell reselection from the first cell 111 to the second cell 121 or vice versa during a DRX sleeping period.

The extended I-DRX cycle I-eDRX may be controlled in the wireless communication device 110 by a new discontinuous reception timer 221a for an extended idle mode that may be set with an extended I-DRX timer value negotiated earlier on NAS level. The discontinuous reception timer 221a for an extended idle mode may also be referred to as an extended discontinuous reception timer 221a. Such an extended discontinuous reception timer 221a is for convenience also named herein I-eDRX Timer or IeDT.

Section 5.1.1 in TR 23.770 v0.2.0 describes how a UE is configured with an eDRX cycle in idle mode by a CN node. At the expiration of the extended I-DRX timer, i.e. when the extended I-DRX cycle lapses, the wireless communication device 110 monitors the wireless communications network 100 for paging using normal DRX parameters.

The wireless communication device 110 may comprise the modules mentioned below and depicted in FIG. 4 for handling the extended DRX cycle I-eDRX and the extended paging cycle.

The core network node 113 may comprise the modules mentioned below and depicted in FIG. 6 for handling the extended DRX cycle I-eDRX and the extended paging cycle.

Actions 200a and 200b

The wireless communication device 110 registers to the core network node 113, e.g. during an Attach procedure. This may for example happen when the wireless communication device 110 is turned on. The wireless communication device 110 may provide a requested eDRX timer value in an Attach request message. The wireless communication device 110 may further provide a requested value of a length of a window in time for monitoring paging, a Paging Transmission Window (PTW), in the Attach request message. During the PTW the wireless communication device 110 monitors the wireless communication network 100 for paging when the extended I-DRX cycle, based on the extended I-DRX value, expires.

The core network node 113 may provide the eDRX timer value to be used in an Attach Accept message to the wireless communication device 110. The core network node 113 may further provide the PTW value to be used in the Attach Accept message.

Actions 201a, 201b, 301, 501

The wireless communication device 110 may set the discontinuous reception timer 221a for extended idle mode when the wireless communication device 110 has registered to the core network node.

As discussed above, the length of the paging cycle may need to be extended, e.g. for power saving reasons. For example, in embodiments herein the extended idle mode may be longer than the frame number range.

The setting may be performed after negotiation with the wireless communications network 100, e.g. with the core network node 113, as indicated with the arrows between the wireless communication device 110 and the core network node 113 in FIG. 2a. The negotiation may for example be part of the registration procedure described above. For example, the wireless communication device 110 may receive from the core network node 113 a value to be used for the setting of the extended discontinuous reception timer 221a. The value may be referred to as an extended I-DRX value.

In some embodiments the wireless communication device 110 provides 200a a requested eDRX timer value in an Attach request message, and the core network node 113 provides 200b the eDRX timer value to be used in an Attach Accept message to the wireless communication device 110.

The core network node 113 may start the I-eDRX timer at the time of sending the Accept message. The wireless communication device 110 may start the timer at the time of receiving the Accept message.

In some embodiments the wireless communication device 110 provides a requested eDRX timer value in a Tracking Area Update (TAU) or a Routing Area Update (RAU) request message, and the core network node 113 provides the eDRX timer value to be used back in the TAU or RAU Accept message to the wireless communication device 110. This will be further described below in actions 203a, 203b, 303, 503.

The core network node 113 may start the I-eDRX timer at the time of sending the RAU or TAU Accept message. The wireless communication device 110 may start the timer at the time of receiving the TAU or RAU Accept message.

The wireless communication device 110 may further set a length of a window in time for monitoring paging, a Paging Transmission Window (PTW), during which the wireless communication device 110 monitors the wireless communication network 100 for paging when the extended I-DRX cycle, based on the extended I-DRX value, expires.

This action may be performed by means such as a setting module 410 in the wireless communication device 110. The setting module 410 may be implemented by a processor 480 in the wireless communication device 110.

Correspondingly, the core network node 113 may set an extended discontinuous reception timer for extended idle mode when the wireless communication device 110 has registered to the core network node 113.

The setting may be performed after negotiation with the wireless communication device 110, as indicated with the arrows between action 201a in the wireless communication device 110 and action 201b in the core network node 113 in FIG. 2a. In some embodiments the core network node 113 receives, from the wireless communication device 110, a value to be used for the setting of the extended discontinuous reception timer 221b. The value may be referred to as an extended I-DRX value.

The core network node 113 may further set a length of a window in time for monitoring paging, the PTW, during which the wireless communication device 110 monitors the network for paging when the extended I-DRX cycle based on the extended I-DRX value expires.

This action may be performed by means such as a setting module 610 in the core network node 113. The setting module 610 may be implemented by a processor 680 in the core network node 113.

It is assumed that due to imperfect synchronization of the extended I-DRX cycle starting point a measure to improve the paging reception robustness is needed.

This is achieved by introducing the PTW during which the wireless communication device 110 monitors the network for paging when the extended I-DRX cycle based on the extended I-DRX value expires.

During the PTW there may be multiple opportunities to page the wireless communication device 110 which monitor the network for paging using normal DRX parameters.

The PTW may be provided to the wireless communication device 110 over NAS when extended I-DRX is negotiated.

When paging the wireless communication device 110 the core network node 113 may provide the PTW as new information, e.g. comprised in a new Information Element (IE), in an existing relevant paging S1/Iu paging message to the radio access node 112. The radio access node 112 may repeat the paging during the PTVV in multiple paging occasions determined by normal DRX parameters.

Actions 202a, 202b, 302, 502

The wireless communication device 110 may start the discontinuous reception timer 221a for the extended idle mode when the wireless communication device 110 registers to the core network node 113.

For example when the wireless communications network 100 is an UMTS network or an LTE network the discontinuous reception timer 221a may be started at reception of an attach accept message from the core network node 113, i.e. the wireless communication device 110 may start the discontinuous reception timer 221a for the extended idle mode when receiving an Attach Accept from the core network node 113.

This action may be performed by means such as a starting module 420 in the wireless communication device 110.

Correspondingly, the core network node 113 may start an extended discontinuous reception timer 221b for the extended idle mode when the wireless communication device 110 registers to the core network node 113.

For example when the wireless communications network 100 is an UMTS network or an LTE network the extended discontinuous reception timer 221b may be started at transmission of an attach accept message to the wireless communication device 110, i.e. the core network node 113 may start the discontinuous reception timer 221b for the extended idle mode when transmitting an Attach Accept to the wireless communication device 110.

This action may be performed by means such as a starting module 620 in the core network node 113.

In summary, the core network node 113 and wireless communication device 110 may start the extended I-DRX cycle when transmitting or receiving an initial NAS message, such as an Attach Request, or when transmitting or receiving the Attach Accept message or upon completing the applicable subsequent NAS procedure. I.e. the core network node 113 may start the extended I-DRX cycle when receiving the Attach Request message or when transmitting the Attach Accept message or upon completing the applicable subsequent NAS procedure described in action 203b below. Similarly, the wireless communication device 110 may start the extended I-DRX cycle when transmitting the Attach Request message or when receiving the Attach Accept message or upon completing the applicable subsequent NAS procedure described in action 203a below.

The extended I-DRX cycles may be maintained, stored and used when the NAS procedure was successfully executed. That is, the timer that represents the extended I-DRX cycles may be maintained, stored and used when the NAS procedure was successfully executed.

The timers may e.g. only be used when the NAS procedure was successfully executed. This, i.e. the timers being used when the NAS procedure was successfully executed, may be independent of the EPS Connection Management (ECM) state of the wireless communication device 110. I.e. Idle/Connected transitions do not stop and/or reset the extended I-DRX cycle.

Figure 7A:
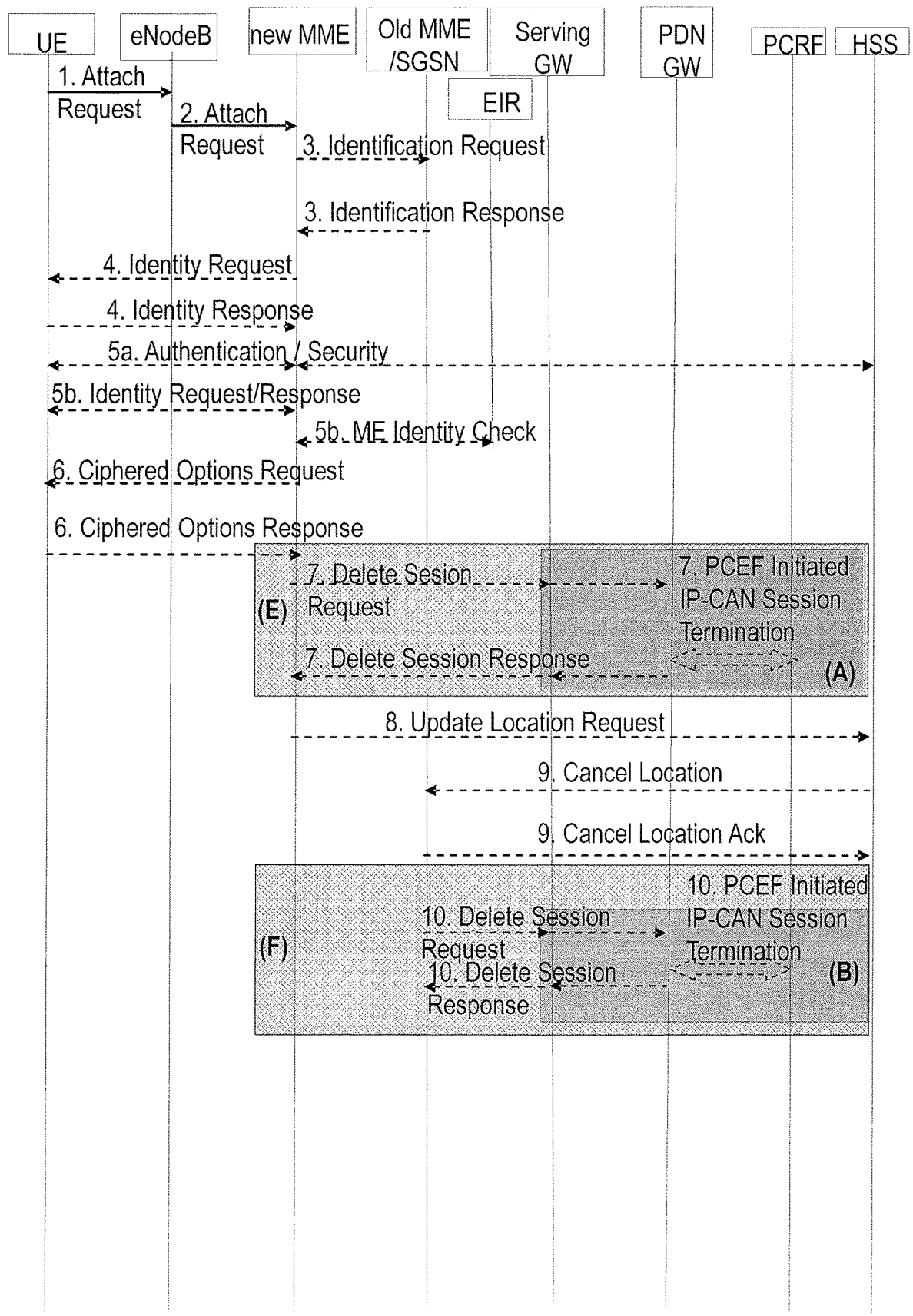
FIG. 7a is a first part of a signalling diagram illustrating the Attach procedure in LTE.
Figure 7B:
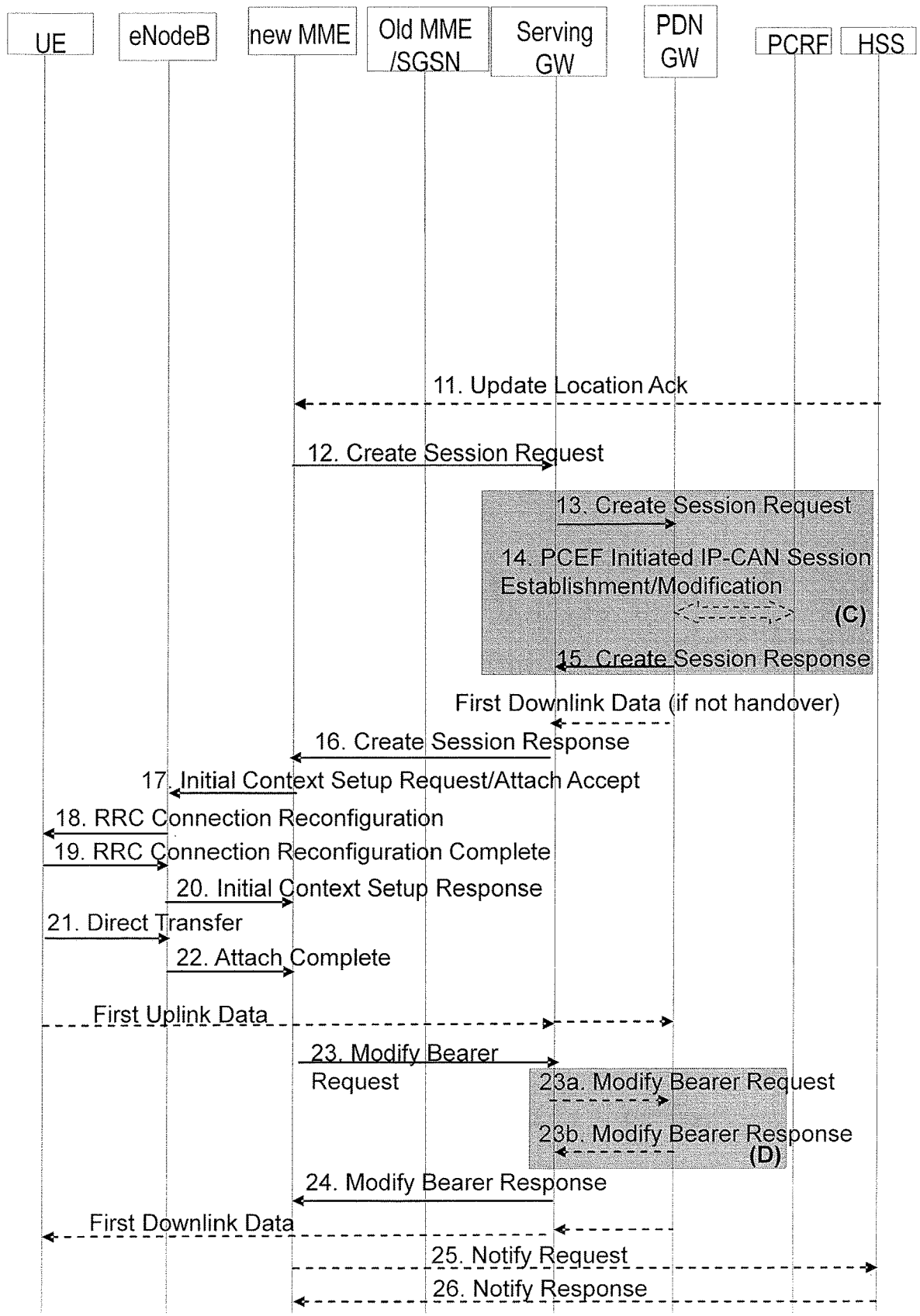
FIG. 7b is a second part of a signalling diagram illustrating the Attach procedure in LTE.

FIG. 7a illustrates a first part, and FIG. 7b illustrates a second part of a detailed Attach Procedure in LTE. The procedure starts with the Attach Request and will be used herein to illustrate which changes to NAS procedures may be introduced to enable a pseudo-synchronized start of the extended discontinuous reception timer in the core network node 113 and the wireless communication device 110.

In the following only the relevant actions from the Attach procedure to enable the pseudo-synchronized start of the extended discontinuous reception timer in the core network node 113 and the wireless communication device 110 will be described. The other actions and network nodes may behave according to legacy operation and will not be described herein.

Action 17: At the transmission of the Attach Accept message the core network node 113 starts an extended discontinuous reception timer set with the relevant extended I-DRX parameters.

Action 18: At reception of the Attach Accept message the wireless communication device 110 starts the extended discontinuous reception timer using the received extended I-DRX parameters.

Similar changes are applicable to Routing Area Update (RAU) and Tracking Area Update (TAU) procedures.

Figure 8A:
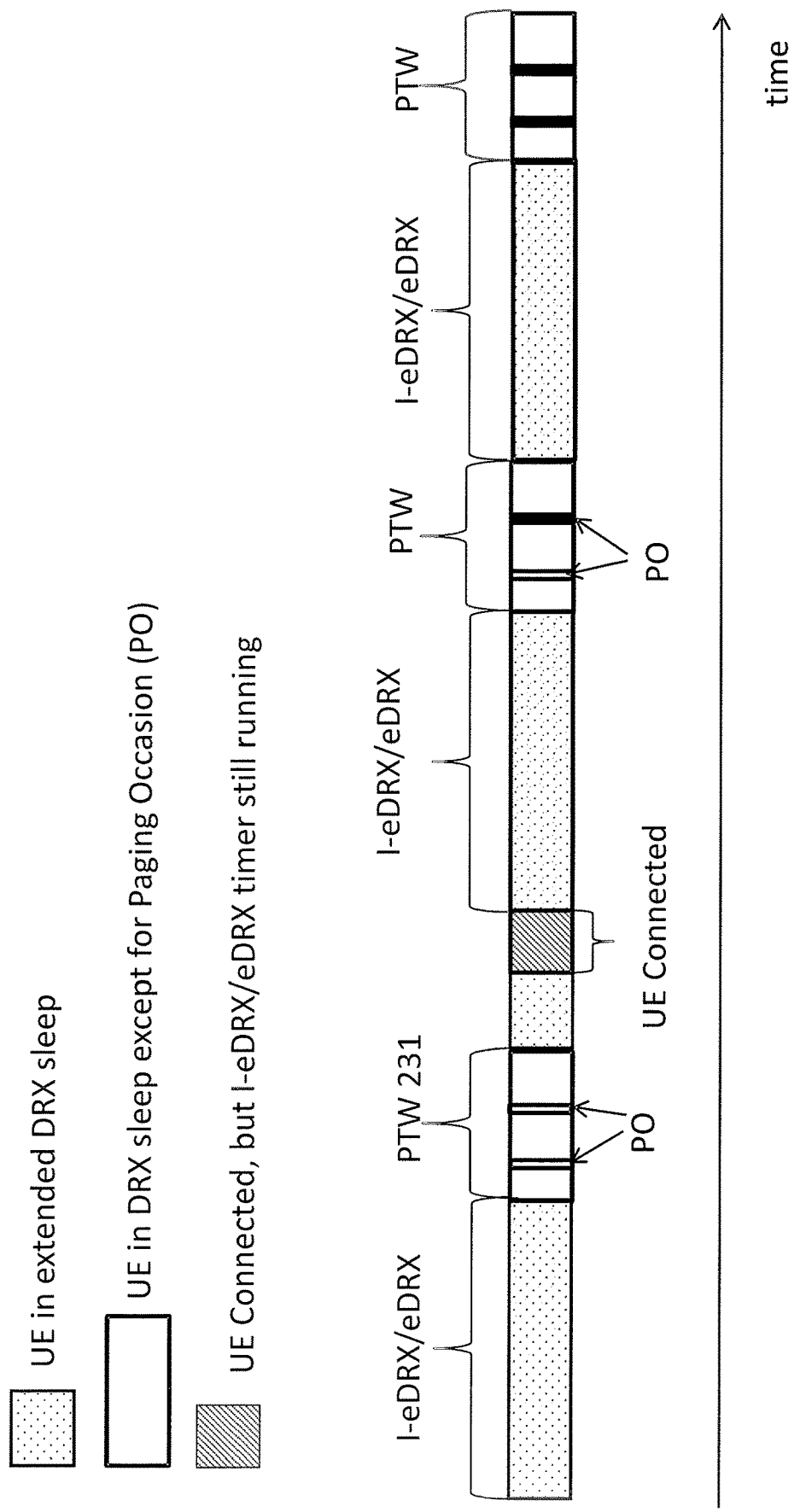
FIG. 8a is a schematic timing diagram illustrating further embodiments herein.
Figure 8B:
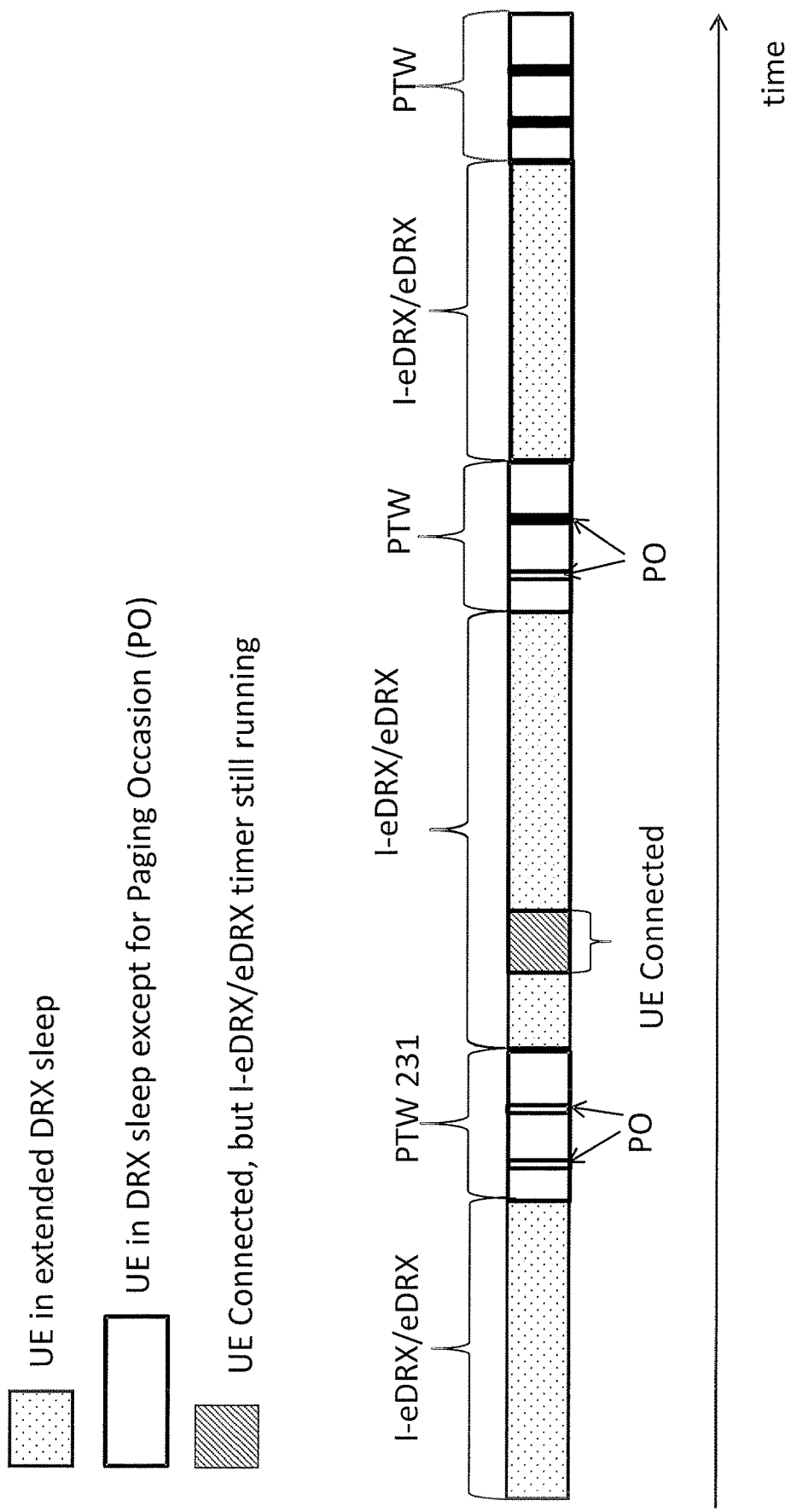
FIG. 8b is a further schematic timing diagram illustrating further embodiments herein.

FIGS. 8a and 8b illustrate the use of the extended I-DRX cycle I-eDRX versus time. In the description of FIGS. 8a and 8b the wireless communication device 110 will be exemplified with a UE. First the UE is in idle mode and the I-eDRX timer is running. In other words, the UE is in extended DRX sleep. This is indicated with a dotted fill of the first box in the figure. The boxes represent different time periods. At the end of the extended I-DRX cycle the UE monitors for the paging message 2061, 2062 at two Paging Occasions (POs) during the PTW 231. That is, during the PTW 231 the UE is in DRX sleep except for the Paging Occasions (PO). The PTW 231 is indicated with a box without any fill. At the end of the PTW 231 the UE enters idle mode again and re-starts the I-eDRX timer. After some time the UE connects to the wireless communications network 100, e.g. to the radio access node 112. This time period is indicated with a box filled with lines. During the time that the UE is connected to the wireless communications network 100 the I-eDRX timer still runs. At the end of the second extended I-DRX cycle the UE monitors for the paging message 2061, 2062 at two paging occasions during a second PTW. At the end of the second PTW the UE enters idle mode again and re-starts the I-eDRX timer. Then the same procedure is restarted again.

FIG. 8a and FIG. 8b further illustrate the usage of PTW and the independence of the extended I-DRX cycle I-eDRX from the state of the wireless communication device 110, e.g. the UE state. That is, the extended I-DRX cycle I-eDRX may be independent of the ECM state of the wireless communication device 110.

Actions 203a, 203b, 303, 503

To cater for possible clock drift due to long inactivity periods and thus potential impacts to the synchronization between the wireless communication device 110 and the core network node 113, the wireless communication device 110 and core network node 113 may resynchronize the extended discontinuous reception timer at each subsequent successful procedure requiring wireless communication device 110/core network node 113 NAS layer communication.

By resynchronizing the extended discontinuous reception timer it becomes more robust because it is not adversely impacted by the clock drift caused by e.g. hardware and implementation related differences between the wireless communication device 110 and the core network node 113.

The procedure requiring NAS layer communication may be a RAU or a TAU.

In UMTS, the routing area is the packet-switched domain equivalent of the location area. A "location area" is a set of base stations that are grouped together to optimise signalling. The Tracking Area (TA) is the LTE counterpart of the location area and routing area. A RAU procedure will happen in e.g. the following two cases:
  the wireless communication device 110 entered a new Routing Area;
  Periodic RAU after periodic timer expires.
Similarly as for the RAU, TAUs are performed periodically, or e.g. when the wireless communication device 110, such as a UE, moves to a TA that is not included in its TA list.

The resynchronization may be achieved through a reset of the extended discontinuous reception timer I-eDRX for extended idle mode in the wireless communication device 110 and in the core network node 113 when transmitting/receiving the initial NAS message or the Accept message of the subsequent NAS layer procedure or upon completing the subsequent applicable procedure.

Resetting means that the extended discontinuous reception timer 221a, 221b is reset to the original value negotiated between the wireless communication device 110 and the wireless communications network 100. Then the timer 221a, 221b is started again immediately, triggered by the resynchronization event. For example, if the original value of the extended discontinuous reception timer 221a, 221b is set to 20 seconds, and the extended discontinuous reception timer 221a, 221b is resynchronised due to a TAU or RAU after 10 seconds, then the extended discontinuous reception timer 221a, 221b will restart in connection with the TAU or RAU at 20 seconds.

The resynchronization may be considered successful if the relevant NAS procedure is considered successfully executed.

From the point of view of the wireless communication device 110, it may resynchronize the discontinuous reception timer for the extended idle mode at subsequent successful procedures requiring NAS layer communication between the wireless communication device 110 and the core network node 113. I.e. the wireless communication device 110 may reset the discontinuous reception timer 221a in response to a successful procedure requiring NAS layer communication between the wireless communication device 110 and the core network node 113.

This action may be performed by means such as a resynchronizing module 430 in the wireless communication device 110.

Correspondingly, the core network node 113 may resynchronize the discontinuous reception timer for the extended idle mode at subsequent successful procedures requiring NAS layer communication between the wireless communication device 110 and the core network node 113. I.e. the core network node 113 may reset the extended discontinuous reception timer 221b in response to a successful procedure requiring NAS layer communication between the wireless communication device 110 and the core network node 113.

This action may be performed by means such as a resynchronizing module 630 in the core network node 113.

Actions 204, 504

The core network node 113 may obtain a paging trigger, such as a Downlink Data Notification (DDN) at any arbitrary point in time. Such a paging trigger may be obtained from e.g. a Serving GateWay (S-GW), or from a Service Capability Exposure Function (SCEF). The core network node 113 may stores the paging trigger for future use.

This action may be performed by means such as an obtaining module 640 in the core network node 113.

Actions 205, 505

In some embodiments the core network node 113 determines when the wireless communication device 110 is to monitor for the paging message 2061, 2062 based on the time when the wireless communication device 110 registers to the core network node 113 and based on the time period 231 for monitoring paging.

The core network node 113 may determine when the extended discontinuous reception timer for the extended idle mode expires.

The core network node 113 may determine the time period 231 when the wireless communication device 110 is to monitor for the paging message 2061, 2062.

The determining may be based on the start of the extended discontinuous reception timer for the extended idle mode.

The determining of the time period 231 may further be based on the PTW. That is, the core network node 113 may determine the start of the time period and the length of the time period, thereby also determining the end of the time period. The start of the time period is based on the start of the extended discontinuous reception timer for the extended idle mode. The length of the time period may be based on the PTW.

In some embodiments the core network node 113 determines when the wireless communication device 110 is to monitor for the paging message based on the time when the wireless communication device 110 registers to the core network node 113, and based on the time period for monitoring paging, and further based on a second instant of time when the wireless communication device 110 conducts the subsequent successful procedure requiring NAS layer communication between the wireless communication device 110 and the core network node 113. I.e. resynchronization performed above in action 203b may also influence when to monitor for the paging message, e.g. by influencing the expiry of the timer.

This action may be performed by means such as a determining module 650 in the core network node 113.

Actions 206, 506

When the core network node 113 has obtained a paging trigger, such as the DDN, the core network node 113 provides the wireless communication device 110 with the paging message 2061, 2062 during the PTW 231, i.e. during the time period when the wireless communication device 110 is to monitor for the paging message 2061, 2062.

In other words, the core network node 113 provides the wireless communication device 110 with the paging message 2061, 2062 during the time period 231 for monitoring paging. The start of the time period 231 is based on an instant of time when the wireless communication device 110 registers to the core network node 113.

Providing the paging message 2061, 2062 may for example be performed when the extended discontinuous reception timer 221b expires.

The start of the time period for monitoring paging is decoupled from the events in the RAN since the start of the time period is based on when the wireless communication device 110 registers with the core network node 113. Therefore the start of the time period is not subject to any uncertainties in the radio propagation path, and consequently a more robust method for handling the extended paging cycle is obtained.

The paging message 2061, 2062 may be sent via the radio access node 112, e.g. by sending a paging request to the radio access node 112.

Figure 9:
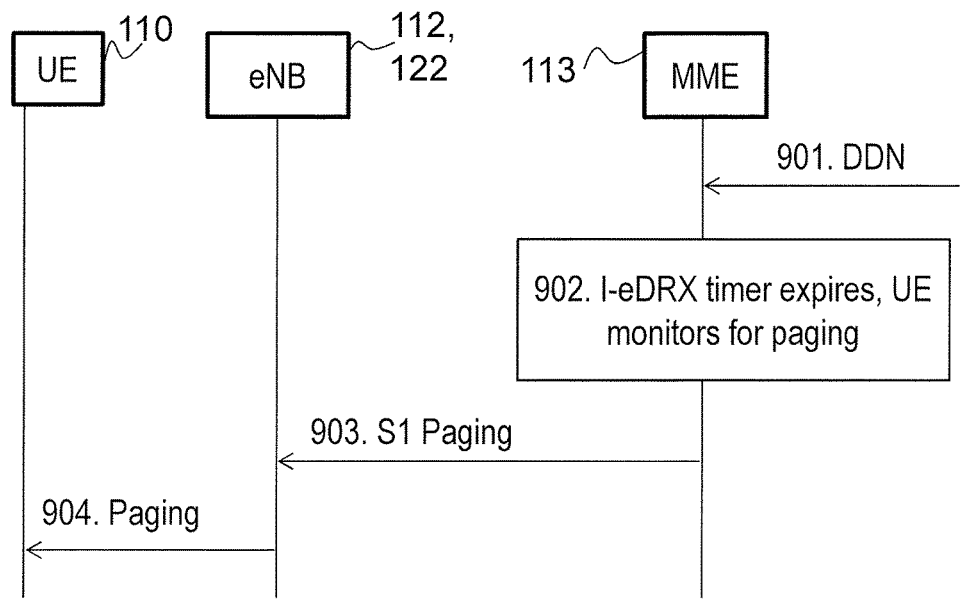
FIG. 9 is a combined signalling diagram and flow chart illustrating a method for paging according to embodiments herein.

FIG. 9 illustrates how the core network node 113 may provide the paging message 2061, 2062 to the wireless communication device 110 in ECM Idle state.

In case of the paging trigger received in the core network node 113 for the wireless communication device 110 in ECM Idle state, the core network node 113 may forward the paging message 2061, 2062 towards the radio access node 112 when the extended I-DRX cycle expires next time. The forwarding to the radio access node 112 may be performed in a timely manner taking possible imperfections in the synchronization between the core network node 113 and the wireless communication device 110 into account.

The following actions illustrate how the core network node 113 handles the paging trigger.

Action 901: The core network node 113 receives a Downlink Data Notification at any arbitrary point in time and stores it.

Action 902: Based on the extended I-DRX value and when the wireless communication device 110 and core network node 113 synchronized the extended discontinuous reception timer the core network node 113 determines that the wireless communication device 110 monitors the network for paging.

Action 903: The core network node 113 sends an S1 Paging message to the radio access node 112, such as a relevant eNB, including the PTW.

Action 904: The radio access node 112 pages the wireless communication device 110 using the available normal DRX parameters taking the PTW into consideration.

Actions 206, 506 may be performed by means such as a providing module 660 in the core network node 113.

Actions 207, 304

Returning now to the wireless communication device 110, it monitors for the paging message 2061, 2062 at one or more paging occasions during the time period 231 for monitoring paging, wherein the start of the time period 231 is based on an instant of time when the wireless communication device 110 registers to the core network node 113.

The monitoring for the paging message 2061, 2062 may be performed when the discontinuous reception timer 221a expires. In other words, the wireless communications device 110 may monitor paging when the discontinuous reception timer for idle mode expires. That is, the wireless communications device 110 is configured to receive the paging messages 2061, 2062 at the one or more paging occasions during the PTW 231.

The start of the time period for monitoring paging is decoupled from the events in the RAN since the start of the time period is based on when the wireless communication device 110 registers with the core network node 113. Therefore the start of the time period is not subject to any uncertainties in the radio propagation path, and consequently a more robust method for handling the extended paging cycle is obtained.

The wireless communication device 110 may determine the time period when the wireless communication device 110 is to monitor for the paging message 2061, 2062.

The monitoring and the determining may be based on the start of the extended discontinuous reception timer for the extended idle mode.

The determining of the time period may further be based on the PTW.

That is, the wireless communication device 110 may determine the start of the time period and the length of the time period, thereby also determining the end of the time period. The start of the time period may be based on the start of the extended discontinuous reception timer for extended idle mode. The length of the time period may be based on the PTW.

In some embodiments the monitoring comprises determining when to monitor for the paging message 2061, 2062 based on the time when the wireless communication device 110 registers to the core network node 113 and based on the time period 231 for monitoring paging.

The monitoring may be performed during the PTW. The wireless communication device 110 may receive the paging message 2061, 2062 during the PTW.

In some embodiments the monitoring comprises determining when to monitor for the paging message based on the time when the wireless communication device 110 registers to the core network node 113, and based on the time period for monitoring paging, and further based on the second instant of time when the wireless communication device 110 conducts the subsequent successful procedure requiring NAS layer communication between the wireless communication device 110 and the core network node 113. I.e. resynchronization performed above in action 203a may also influence when to monitor for the paging message, e.g. by influencing the expiry of the timer.

This action may be performed by means such as a monitoring module 440 in the wireless communication device 110. The monitoring module may comprise a determining module 450.

Embodiments herein describe methods for robust DRX timer triggering and re-synchronization. The instant of time when the wireless communication device 110 conducts a NAS procedure to the CN triggers the DRX timers and each subsequently successful NAS level procedure may re-synchronize the timers between the wireless communication device 110 and the CN.

The re-synchronization is performed when the following two conditions are fulfilled:
The wireless communication device 110 has registered to the core network node 113; and
The wireless communication device 110 has completed the successful procedure requiring NAS layer communication between the wireless communication device 110 and the core network node 113, e.g. at TAU.

The method is robust because it is decoupled from the events in the RAN and it is therefore not subject to any uncertainties in the radio propagation.

An effect of the wireless communication device 110 and the core network node 113 determining the time period for monitoring the paging message 2061, 2062 based on when the wireless communication device 110 has registered with the core network node 113 is that the wireless communication device 110 and the core network node 113 are able to handle the extended paging cycle.

Figure 4:
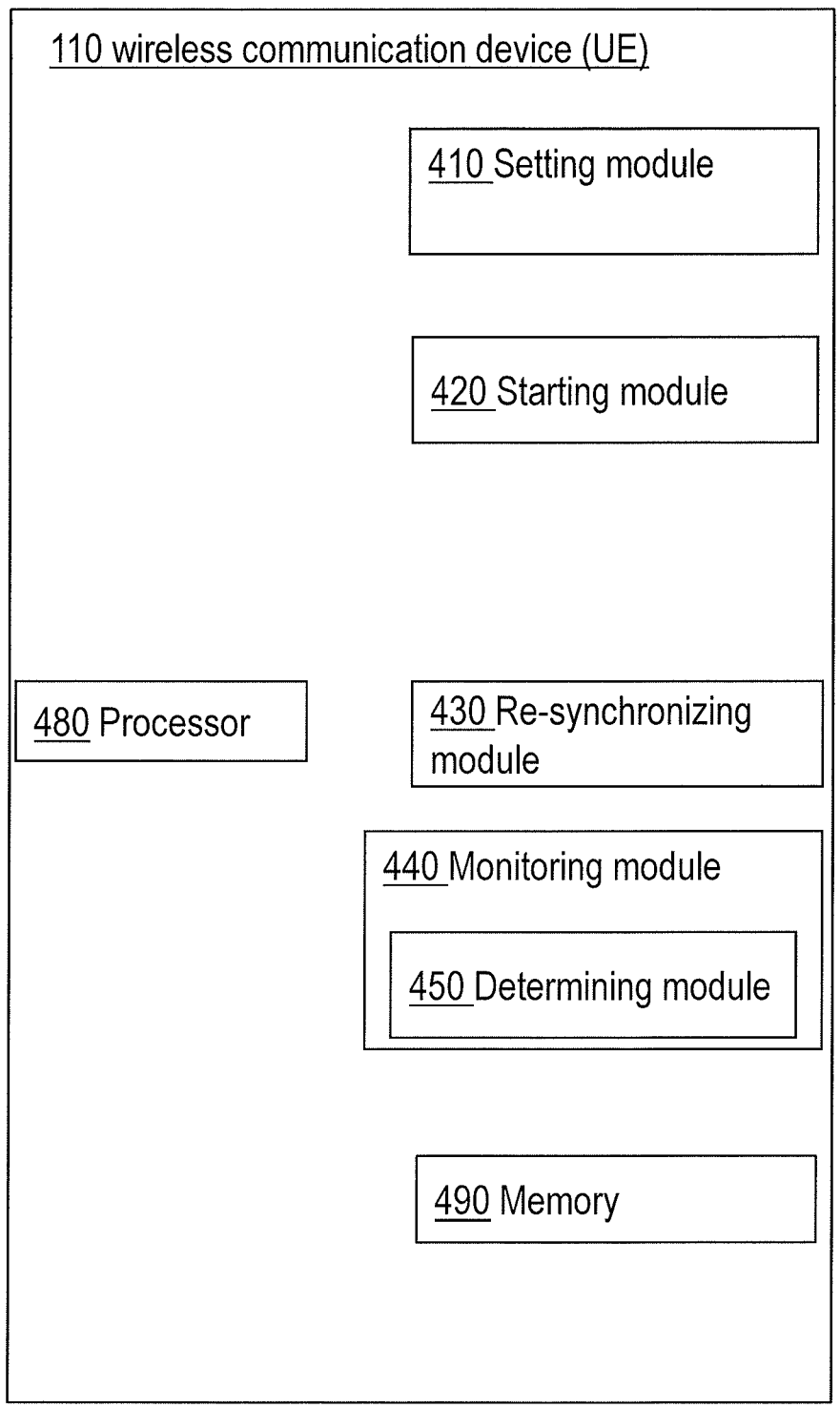
FIG. 4 is a schematic block diagram illustrating embodiments of a wireless communication device.

To perform the method actions of for monitoring for the paging message 2061, 2062 from the core network node 113 in the wireless communications network 100, described above in relation to FIGS. 2a, 2b and 3, the wireless communication device 110 may comprise the following arrangement depicted in FIG. 4.

The wireless communication device 110 is configured to, e.g. by means of the monitoring module 440 configured to, monitor for the paging message 2061, 2062 at one or more paging occasions during the time period 231 for monitoring paging, wherein the start of the time period 231 is based on an instant of time when the wireless communication device 110 registers to the core network node 113.

In some embodiments the wireless communication device 110 is further configured to monitor for the paging message 2061, 2062 by being configured to determine when to monitor for the paging message 2061, 2062 based on the time when the wireless communication device 110 registers to the core network node 113 and based on the time period 231 for monitoring paging.

The monitoring module 440 may be implemented, at least in part, by a processor 480 in the wireless communication device 110.

In some embodiments the wireless communication device 110 is further configured to use the extended discontinuous reception cycle I-eDRX, related to the extended paging cycle, for receiving the paging message 2061, 2062.

Then the wireless communication device 110 may be configured to, e.g. by means of the starting module 420 configured to, start the discontinuous reception timer 221a for the extended idle mode when the wireless communication device 110 registers to the core network node 113, and further configured to, e.g. by means of the monitoring module 440 configured to, monitor for the paging message 2061, 2062 when the discontinuous reception timer 221a expires.

When the wireless communications network 100 is an UMTS network or an LTE network, then the wireless communication device 110 may be further configured to start the discontinuous reception timer 221a at reception of an attach accept message from the core network node 113.

The starting module 420 may be implemented, at least in part, by the processor 480 in the wireless communication device 110.

In some embodiments the wireless communication device 110 is configured to, e.g. by means of the re-synchronizing module 430 configured to, reset the discontinuous reception timer 221a at the successful procedure requiring NAS layer communication between the wireless communication device 110 and the core network node 113.

The re-synchronizing module 430 may be implemented, at least in part, by the processor 480 in the wireless communication device 110.

Figure 6:
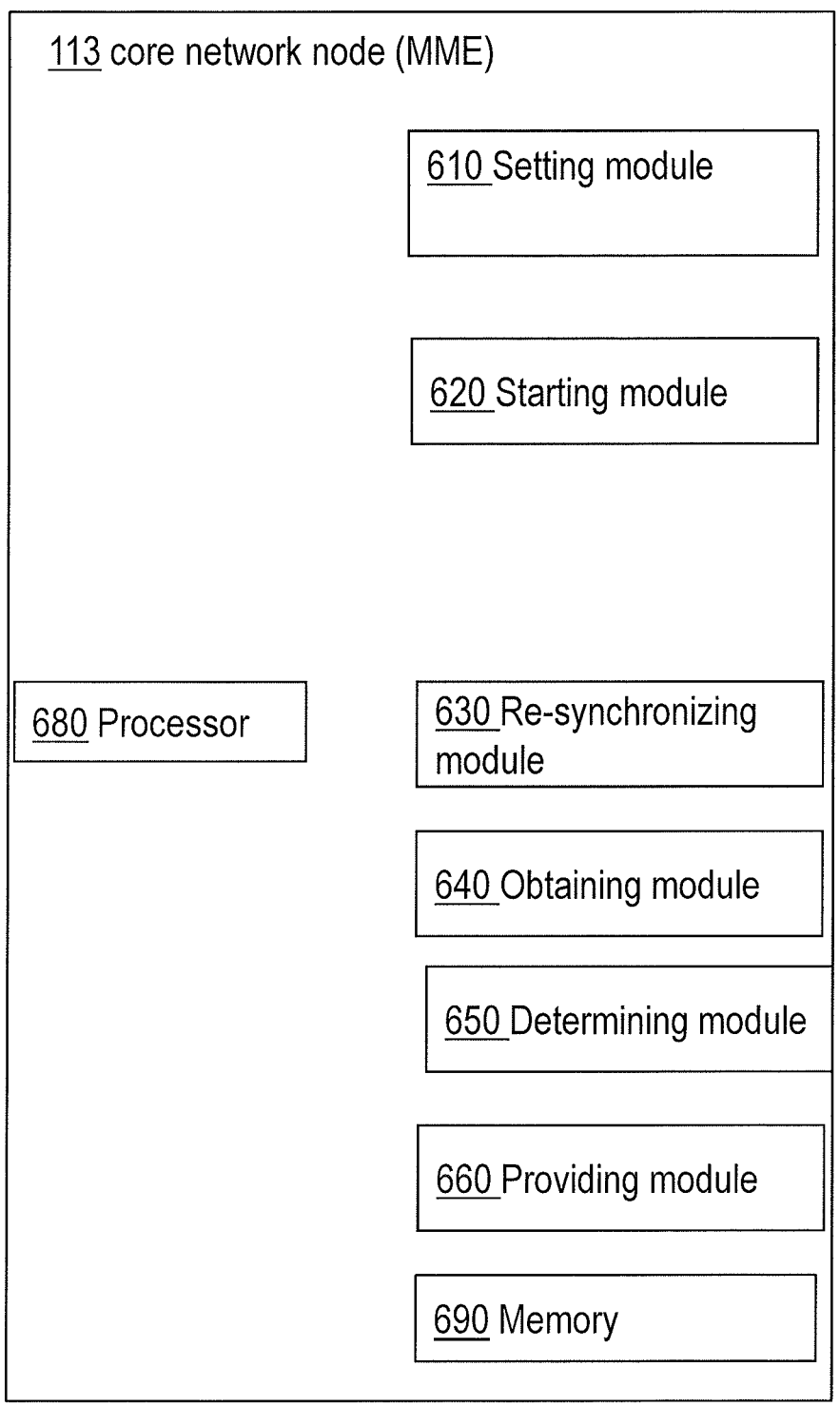
FIG. 6 is a schematic block diagram illustrating embodiments of a core network node.

To perform the method actions of for monitoring for the paging message 2061, 2062 from the core network node 113 in the wireless communications network 100, described above in relation to FIGS. 2a, 2b and 5, the core network node 113 may comprise the following arrangement depicted in FIG. 6.

The core network node 113 is configured to, e.g. by means of the providing module 660 configured to, provide the wireless communication device 110 with the paging message 2061, 2062 during the time period 231 for monitoring paging. The start of the time period 231 is based on an instant of time when the wireless communication device 110 registers to the core network node 113.

The providing module 660 may be implemented, at least in part, by a processor 680 in the core network node 113.

In some embodiments the core network node 113 is further configured to use the extended discontinuous reception cycle I-eDRX related to the extended paging cycle used for receiving the paging message 2061, 2062.

Then the core network node 113 may be configured to, e.g. by means of the starting module 620 configured to, start an extended discontinuous reception timer 221b for the extended idle mode when the wireless communication device 110 registers to the core network node 113, and further configured to, e.g. by means of the providing module 660 configured to, provide the paging message 2061, 2062 when the extended discontinuous reception timer 221b expires.

When the wireless communications network 100 is an UMTS network or an LTE network, then the core network node 113 may be further configured to start the extended discontinuous reception timer 221b at transmission of an attach accept message to the wireless communication device 110.

The starting module 620 may be implemented, at least in part, by the processor 680 in the core network node 113.

In some embodiments the core network node 113 is configured to, e.g. by means of the re-synchronizing module 630 configured to, reset the extended discontinuous reception timer 221b at the successful procedure requiring NAS layer communication between the wireless communication device 110 and the core network node 113.

The re-synchronizing module 630 may be implemented, at least in part, by the processor 680 in the core network node 113.

The core network node 113 may be configured to, e.g. by means of the determining module 650 configured to, determine when the wireless communication device 110 is to monitor for the paging message 2061, 2062 based on the time when the wireless communication device 110 registers to the core network node 113 and based on the time period 231 for monitoring paging.

The determining module 650 may be implemented, at least in part, by the processor 680 in the core network node 113.

The embodiments herein may be implemented through one or more processors, such as the processor 480 in the wireless communication device 110 depicted in FIG. 4, and the processor 680 in the core network node 113 depicted in FIG. 6 together with computer program code for performing the functions and actions of the embodiments herein. The program code mentioned above may also be provided as a computer program product, for instance in the form of a data carrier carrying computer program code for performing the embodiments herein when being loaded into the wireless communication device 110 and the core network node 113. One such carrier may be in the form of a CD ROM disc. It is however feasible with other data carriers such as a memory stick. The computer program code may furthermore be provided as pure program code on a server and downloaded to the wireless communication device 110 and core network node 113.

Thus, the methods according to the embodiments described herein for the wireless communication device 110 and the core network node 113 may be implemented by means of a computer program product, comprising instructions, i.e., software code portions, which, when executed on at least one processor, cause the at least one processor to carry out the actions described herein, as performed by the wireless communication device 110 and the core network node 113. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communication device 110 and the core network node 113. In some embodiments, the computer-readable storage medium may be a non-transitory computer-readable storage medium.

The wireless communication device 110 and the core network node 113 may further each comprise a memory 490, 690, comprising one or more memory units. The memory 490, 690 is arranged to be used to store obtained information such as the time when the wireless communication device 110 registers with the CN, DRX timers, DRX cycles, PTW, and applications etc. to perform the methods herein when being executed in the wireless communication device 110 and the core network node 113.

As mentioned above, it is an object of embodiments herein to provide an improved way of handling an extended DRX cycle and thus an extended paging cycle in the wireless communication system 100.

A further object of embodiments herein is to provide an improved way of determining the time period when the wireless communication device is to monitor for the paging message 2061, 2062.

According to some aspect of embodiments herein, the object is achieved by a method performed by the wireless communication device 110 for handling the extended discontinuous reception cycle eDRX related to an extended paging cycle. The extended paging cycle is used for receiving the paging message 2061, 2062 from the core network node 113 operating in the wireless communications network 100. The extended discontinuous reception cycle eDRX and the extended paging cycle are longer than the frame number range of the wireless communications network 100.

The wireless communication 110 device may: Start an extended discontinuous reception timer I-eDRX timer for an extended idle mode when the wireless communication device 110 has registered to the core network node 113. The extended idle mode is longer than the frame number range.

Determine the time period when the wireless communication device 110 is to monitor for the paging message 2061, 2062. The determining is based on the start of the discontinuous reception timer for the extended idle mode.

According to some further aspect of embodiments herein, the object is achieved by the wireless communication device 110 configured to perform the method above.

According to yet another aspect of embodiments herein, the object is achieved by a method performed by the core network node 113 for handling an extended discontinuous reception cycle related to an extended paging cycle. The extended paging cycle is used by the wireless communication device 110 for receiving the paging message 2061, 2062 from the core network node 113 operating in the wireless communications network 100. The extended discontinuous reception cycle and the extended paging cycle is longer than the frame number range of the wireless communications network.

The core network node 113 may:

Start an extended discontinuous reception timer for an extended idle mode when the wireless communication device 110 has registered to the core network node. The extended idle mode is longer than the frame number range.

Determine the time period when the wireless communication device 110 is to monitor for the paging message 2061, 2062. The determining is based on the start of the discontinuous reception timer for the extended idle mode.

Provide the wireless communication device 110 with the paging message 2061, 2062 during the time period when the wireless communication device 110 is to monitor for the paging message 2061, 2062.

According to yet some further aspect of embodiments herein, the object is achieved by the core network node 113 configured to perform the method above.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first cell and a second cell should be considered to be non-limiting and does in particular not imply a certain hierarchical relation between the two.

The invention claimed is:

1. A method performed by a wireless communication device for monitoring for a paging message from a core network node in a wireless communications network, the method comprising:
   obtaining, from the core network node, a length of a paging transmission window, the paging transmission window comprising a time period for monitoring paging after a discontinuous reception timer for an extended idle mode expires;
   starting the discontinuous reception timer for the extended idle mode when the wireless communication device registers to the core network node, wherein the extended idle mode is longer than a frame number range of the wireless communications network;
   when the discontinuous reception timer expires, monitoring for the paging message at one or more paging occasions during the time period for monitoring paging, wherein a starting time of the time period is based on: an instant of time when the wireless communication device registers to the core network node; and a length of the discontinuous reception timer; and
   resetting the discontinuous reception timer in response to a successful procedure requiring Non-Access Stratum, NAS, layer communication between the wireless communication device and the core network node.

2. The method according to claim 1, wherein the wireless communications network is a Universal Mobile Telecommunication System, UMTS, network or a Long Term Evolution, LTE, network, and wherein the discontinuous reception timer is started at reception of an attach accept message from the core network node.

3. A method performed by a core network node for providing a paging message to a wireless communication device in a wireless communications network, the method comprising:
   provide, to the wireless communication device, a length of a paging transmission window, the paging transmission window comprising a time period for monitoring paging after a discontinuous reception timer for an extended idle mode expires;
   starting the discontinuous reception timer for the extended idle mode when the wireless communication device registers to the core network node, wherein the extended idle mode is longer than a frame number range of the wireless communications network;
   when the discontinuous reception timer expires, providing the wireless communication device with a paging message during the time period for monitoring paging, wherein a starting time of the time period is based on: an instant of time when the wireless communication device registers to the core network node; and a length of the discontinuous reception timer; and
   resetting the discontinuous reception timer in response to a successful procedure requiring Non-Access Stratum, NAS, layer communication between the wireless communication device and the core network node.

4. The method according to claim 3, wherein the wireless communications network is a Universal Mobile Telecommunication System, UMTS, network or a Long Term Evolution, LTE, network, and wherein the discontinuous reception timer is started at transmission of an attach accept message to the wireless communication device.

5. A wireless communication device for monitoring for a paging message from a core network node in a wireless communications network, which wireless communication device comprises a processor and a memory, said memory containing instructions executable by said processor whereby said wireless communication device is operative to:
   obtain, from the core network node, a length of a paging transmission window, the paging transmission window comprising a time period for monitoring paging after a discontinuous reception timer for an extended idle mode expires;
   start the discontinuous reception timer for the extended idle mode when the wireless communication device registers to the core network node, wherein the extended idle mode is longer than a frame number range of the wireless communications network;
   when the discontinuous reception timer expires, monitor for the paging message at one or more paging occasions during the time period for monitoring paging, wherein a starting time of the time period is based on: an instant of time when the wireless communication device registers to the core network node; and a length of the discontinuous reception timer; and reset the discontinuous reception timer in response to a successful procedure requiring Non-Access Stratum, NAS, layer communication between the wireless communication device and the core network node.

6. The wireless communication device according to claim 5, wherein the wireless communications network is a Universal Mobile Telecommunication System, UMTS, network or a Long Term Evolution, LTE, network, and wherein the wireless communication device is further configured to start the discontinuous reception timer at reception of an attach accept message from the core network node.

7. The wireless communication device according to claim 5, wherein the procedure requiring NAS layer communication is a Routing Area Update or a Tracking Area Update.

8. The wireless communication device according to claim 5, further operative to monitor for the paging message by being configured to determine when to monitor for the paging message based on the time when the wireless communication device registers to the core network node and based on the time period for monitoring paging.

9. A core network node for providing a paging message to a wireless communication device in a wireless communications network, which core network node comprises a processor and a memory said memory containing instructions executable by said processor whereby said core network node is operative to:
provide, to the wireless communication device, a length of a paging transmission window, the paging transmission window comprising a time period for monitoring paging after a discontinuous reception timer for an extended idle mode expires;
start the discontinuous reception timer for the extended idle mode when the wireless communication device registers to the core network node, wherein the extended idle mode is longer than a frame number range of the wireless communications network;
when the discontinuous reception timer expires, provide the wireless communication device with a paging message during the time period for monitoring paging, wherein a starting time of the time period is based on: an instant of time when the wireless communication device registers to the core network node; and a length of the discontinuous reception timer; and
reset the discontinuous reception timer in response to a successful procedure requiring Non-Access Stratum, NAS, layer communication between the wireless communication device and the core network node.

10. The core network node according to claim 9, wherein the wireless communications network is a Universal Mobile Telecommunication System, UMTS, network or a Long Term Evolution, LTE, network, and wherein the core network node is further configured to start the discontinuous reception timer at transmission of an attach accept message to the wireless communication device.

11. The core network node according to claim 9, wherein the procedure requiring NAS layer communication is a Routing Area Update or a Tracking Area Update.

12. The core network node according to claim 9, further operative to:
determine when the wireless communication device is to monitor for the paging message based on the time when the wireless communication device registers to the core network node and based on the time period for monitoring paging.

* * * * *